(12) United States Patent
Kurumatani

(10) Patent No.: US 7,258,475 B2
(45) Date of Patent: Aug. 21, 2007

(54) HEADLAMP

(75) Inventor: Toshimitsu Kurumatani, Kawachinagano (JP)

(73) Assignee: Cateye Co., Ltd., Osaka (JP)

( * ) Notice: Subject to any disclaimer, the term of this patent is extended or adjusted under 35 U.S.C. 154(b) by 32 days.

(21) Appl. No.: 11/064,560

(22) Filed: Feb. 24, 2005

(65) Prior Publication Data

US 2005/0189533 A1 Sep. 1, 2005

(30) Foreign Application Priority Data

Feb. 26, 2004 (JP) ............................. 2004-051236

(51) Int. Cl.
*F21V 29/02* (2006.01)
(52) U.S. Cl. ..................... 362/547; 362/294; 362/373; 362/475
(58) Field of Classification Search ............... 362/475, 362/476, 545, 547, 548, 507, 294, 372, 96, 362/218, 264, 345
See application file for complete search history.

(56) References Cited

U.S. PATENT DOCUMENTS

| 2,931,028 | A | * | 3/1960 | Propst ........................ 362/475 |
| 5,857,767 | A | * | 1/1999 | Hochstein ................... 362/294 |
| 6,357,893 | B1 | | 3/2002 | Belliveau .................... 362/285 |
| 6,402,347 | B1 | | 6/2002 | Maas .......................... 362/294 |

FOREIGN PATENT DOCUMENTS

| CA | 2450413 A1 | 5/2004 |
| DE | 29509375 | 8/1994 |
| DE | 20312760 | 10/2003 |
| EP | 1336798 | 8/2003 |

OTHER PUBLICATIONS

Partial English Translation of Japanese Utility Model Laying-Open No. 02-031003 (3 pages), Date of Laying-Open: Feb. 27, 1990, "Lamp for Vehicle", Utility Model Appln. No. 63-108230, Filing Date: Aug. 19, 1988, Applicant: Ichikoh industries, Ltd., Inventor: Toshinori Suzuki.
a Canadian Office Action dated Feb. 27, 2007 citing a Canadian patent.

* cited by examiner

*Primary Examiner*—Sandra O'Shea
*Assistant Examiner*—Bao Q. Truong
(74) *Attorney, Agent, or Firm*—Olson & Hierl, Ltd.

(57) ABSTRACT

In a casing of a headlamp, a substrate portion to which a light-emitting diode as a light source is mounted, and a battery case accommodating a battery for providing necessary power to the light-emitting diode are provided. The substrate portion is spaced apart from a partition disposed on the front side of the battery case, with spacing provided therebetween. The partition is provided with a vent hole, having an upper vent hole and a lower vent hole, for establishing communication of the spacing between the substrate portion and the partition with the space within the battery case, for circulation of the air. Thus, a headlamp capable of suppressing adverse effects of the heat generated from the light-emitting diode or the like on the elements mounted on the substrate is provided.

10 Claims, 7 Drawing Sheets

HEADLAMP

BACKGROUND OF THE INVENTION

1. Field of the Invention

The present invention relates to a headlamp, and more particularly to a headlamp employing a light-emitting diode.

2. Description of the Background Art

Conventionally, a light bulb was used for a headlamp mounted to a bicycle or the like, as in Japanese Utility Model Laying-Open No.02-031003. In recent years, however, with advancement of semiconductor elements and from the standpoint of low power consumption, a light-emitting diode has been adopted. In the headlamp employing the light-emitting diode, the light-emitting diode is mounted on a substrate portion and arranged within a prescribed casing, and is provided with necessary power from a battery housed in a battery case within the casing to turn on a light.

When the intensity of the light emitted from the light-emitting diode is increased to provide brighter light, heat is also generated from the light-emitting diode. If the temperature of the bonded portion of the light-emitting diode increases, luminous efficiency of the light-emitting diode decreases, leading to shortening of its life as well. Thus, it is desirable to provide a heat sink to absorb and dissipate the generated heat so as to suppress the increase in temperature of the bonded portion of the light-emitting diode.

Further, soldering for bonding the light-emitting diode to the substrate portion increases the temperature of the substrate portion, and the generated heat will affect the elements mounted on the substrate portion, including the light-emitting diode.

Thus, in order to protect the light-emitting diode and other elements mounted on the substrate portion from the heat, the substrate portion is made, e.g., of an aluminum plate having heat-dissipating capability, and a copper foil formed on the aluminum plate with an epoxy resin interposed therebetween. This means that the light-emitting diode is mounted on the aluminum plate with the epoxy resin and the copper foil interposed therebetween.

With the conventional headlamp employing the light-emitting diode, however, the heat dissipated from the substrate portion will remain around the substrate portion, making it difficult to suppress the temperature increase of the substrate portion.

Further, since the epoxy resin is disposed on the aluminum plate, sufficient conduction of the heat generated from the light-emitting diode or the heat upon soldering the light-emitting diode to the aluminum substrate portion cannot be expected, leading to degradation of the light-emitting diode and others.

SUMMARY OF THE INVENTION

The present invention has been made to solve the above-described problems. An object of the present invention is to provide a headlamp that can prevent heat generated from a light-emitting diode and heat upon bonding the light-emitting diode on a substrate portion from adversely affecting the light-emitting diode and other elements mounted on the substrate portion.

A headlamp according to the present invention is a headlamp employing a light-emitting diode, and includes a prescribed casing, a battery case, a substrate portion, and a vent hole. The battery case is formed in the casing and accommodates a battery for providing prescribed power to the light-emitting diode. The substrate portion is provided in the casing, spaced apart from the battery case, and mounted with the light-emitting diode, and serves as a heat sink. The vent hole is for circulation of the air between the spacing that is provided between the substrate portion and the battery case and the inside of the battery case.

With this configuration, the heat generated from the light-emitting diode and conducted to the substrate portion is dissipated to the surrounding area, so that the air located in the spacing is warmed. The warmed air in the spacing flows via the vent hole into the battery case where it is cooled, and the cooled air flows via the vent hole back to the spacing where it is warmed again. As this cycle is repeated, the air circulates through the spacing and the inside of the battery case. Accordingly, compared to the case of a conventional headlamp not provided with a vent hole, circulation of the air enables efficient dissipation of the heat of the substrate portion, thereby preventing the heat generated from the light-emitting diode from adversely affecting the light-emitting diode and other elements mounted on the substrate portion.

Preferably, the vent hole is provided at both an upper portion and a lower portion of a partition separating the spacing from the inside of the battery case, to guide the air warmed and flowing upward in the spacing efficiently to the battery case, and to guide the air cooled and flowing downward in the battery case efficiently to the spacing.

Still preferably, the substrate portion includes a substrate main body, and a holder provided on the substrate main body and to which the light-emitting diode is mounted. The substrate main body is preferably formed only of a metal plate, and the holder is preferably provided to contact a surface of the metal plate.

With this configuration, the heat generated from the light-emitting diode is efficiently conducted to the metal plate, and efficiently dissipated into the air circulating through the spacing and the inside of the battery case.

Alternatively, the substrate main body of the substrate portion may include a metal plate, and a metal foil formed on the metal plate with a resin interposed therebetween, since the vent hole is provided to efficiently cool the substrate portion.

Specifically, the metal foil is preferably a copper foil.

Further, the metal plate constituting the substrate main body is preferably an aluminum plate.

Still preferably, the substrate portion includes an opening penetrating therethrough, and a rivet mounted to the opening and connected with a terminal of the light-emitting diode and also made to electrically contact the battery housed in the battery case. The rivet is preferably a hollow rivet.

With this configuration, since the rivet is hollow, the heat upon soldering the terminal of the light-emitting diode to the rivet is prevented from being conducted to the substrate portion serving as a heat-dissipating plate. Accordingly, it is possible to carry out soldering without applying excessive heat to the part of the substrate portion to which the terminal is connected, thereby suppressing degradation of the elements mounted on the substrate portion.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
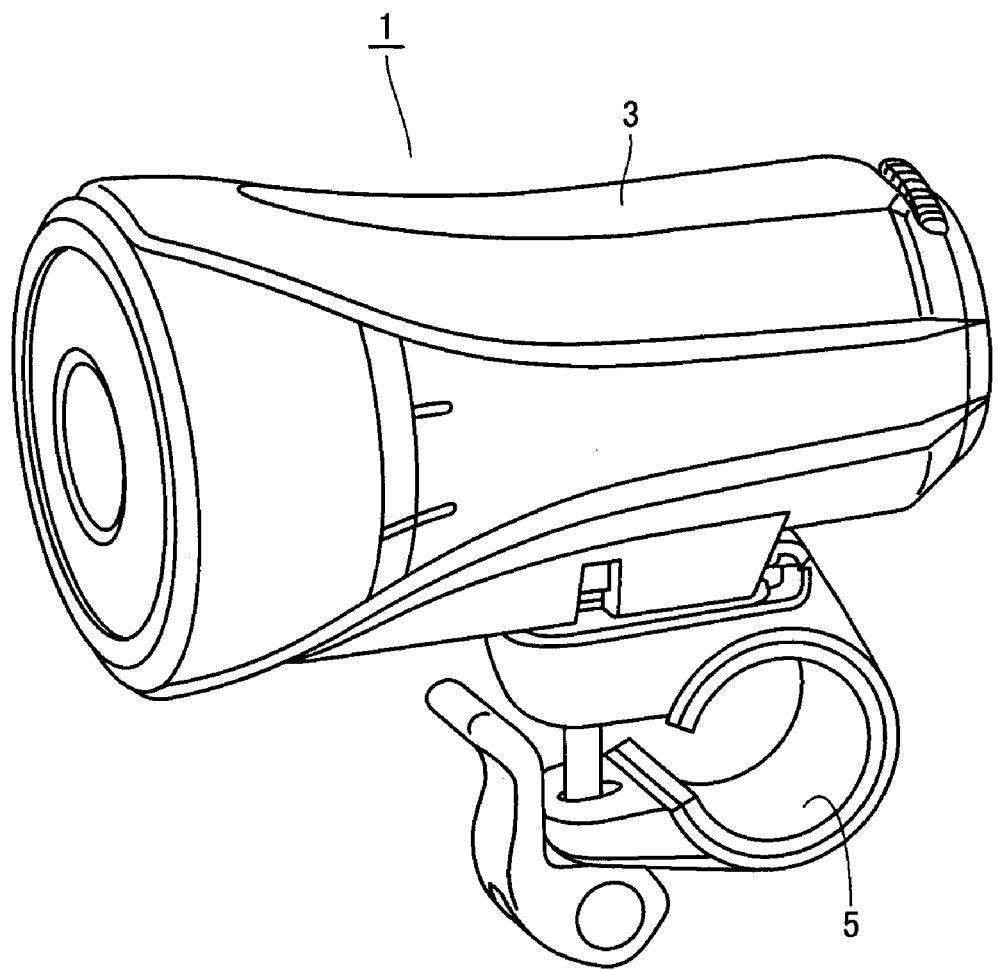
FIG. 1 shows an appearance of a headlamp employing a light-emitting diode according to a first embodiment of the present invention.

As an example of the headlamp employing a light-emitting diode according to a first embodiment of the present invention, a headlamp mounted to a bicycle is explained. As shown in FIG. 1, the headlamp 1 has a casing 3 for accommodating a light source, a battery and others to protect them against weather. Casing 3 is provided with an attachment 5 for attaching headlamp 1 to, e.g., a handlebar (not shown) of a bicycle.

Figure 2:
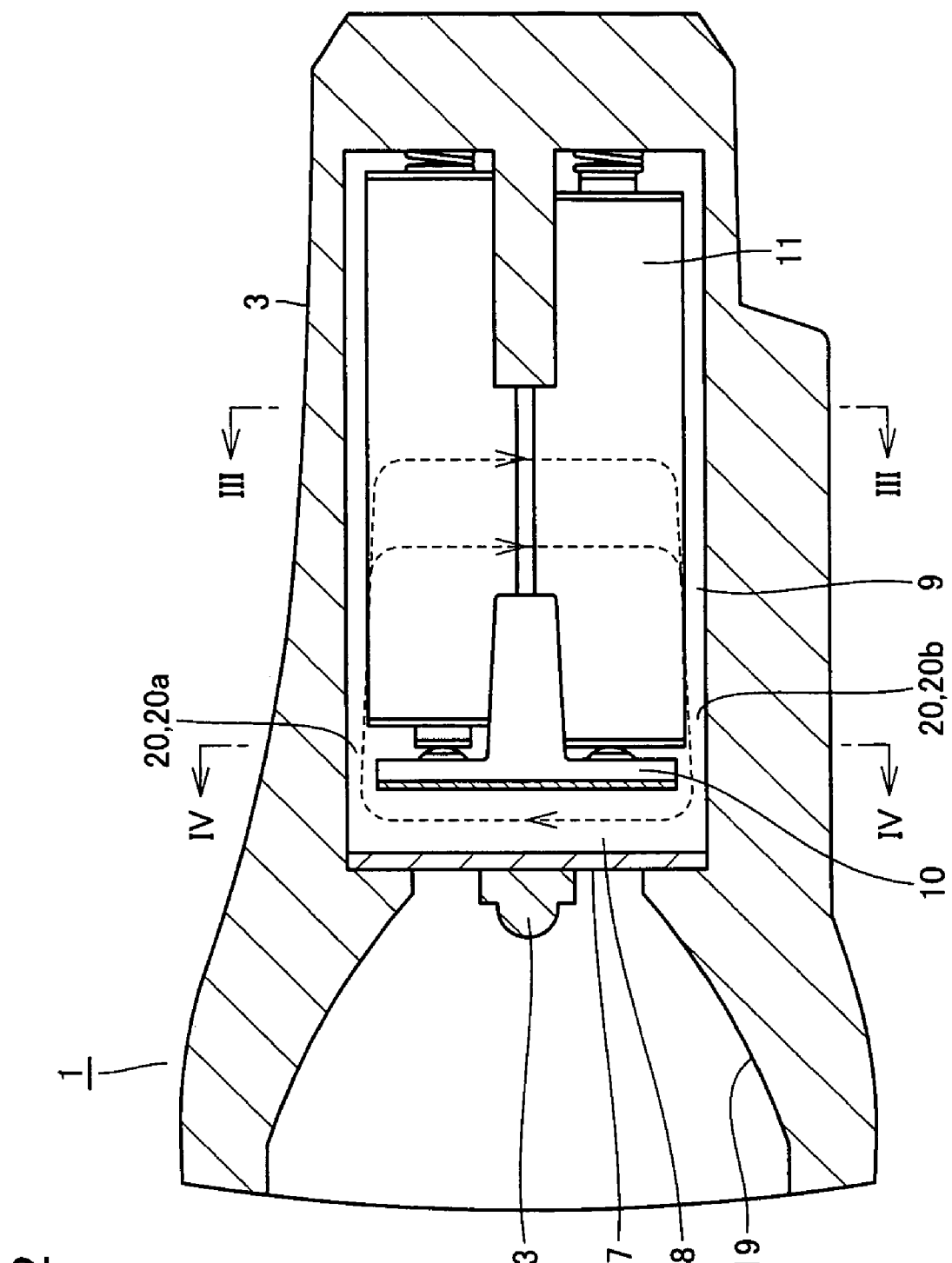
FIG. 2 is a vertical cross sectional view of the headlamp of the first embodiment shown in FIG. 1.

As shown in FIG. 2, provided within casing 3 of headlamp 1 are a substrate portion 7 to which a light-emitting diode 13 as the light source is mounted, and a battery case 9 for housing a battery 11 for supplying necessary power to light-emitting diode 13. A reflecting mirror 19 is provided on the same side as light-emitting diode 13, for directing the light emitted from light-emitting diode 13 frontward.

Figure 3:
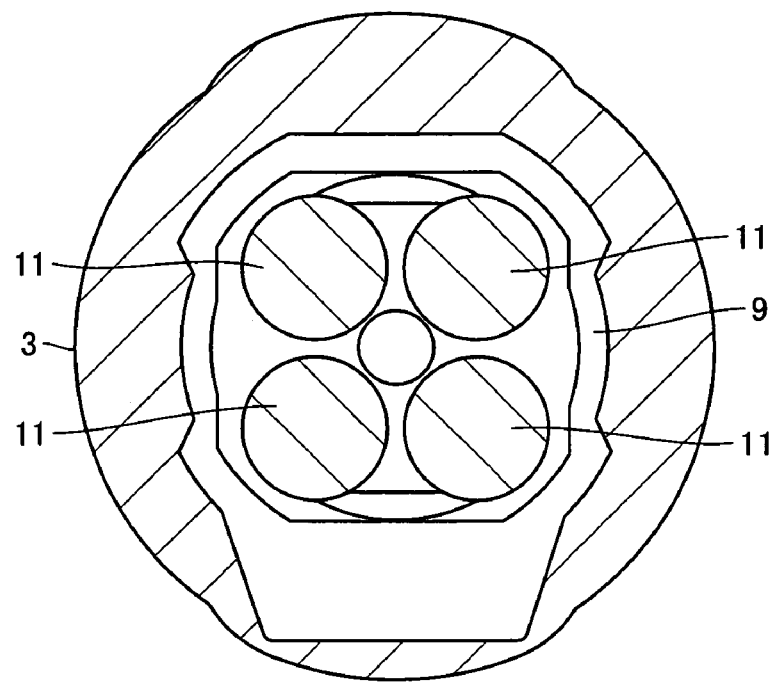
FIG. 3 is a cross sectional view of the headlamp of the first embodiment taken along the line III-III in FIG. 2.

Substrate portion 7, mounted with light-emitting diode 13 and serving as a heat sink, is arranged spaced apart from a partition 10 positioned on the front side of battery case 9, with spacing 8 provided between substrate portion 7 and partition 10. Substrate portion 7 is arranged such that a rivet (see FIG. 5) mounted on substrate portion 7 comes into contact with a prescribed terminal (see FIG. 5) provided on partition 10 of battery case 9. Battery case 9 has a space for accommodating four batteries 11, for example, as shown in FIG. 3.

Figure 4:
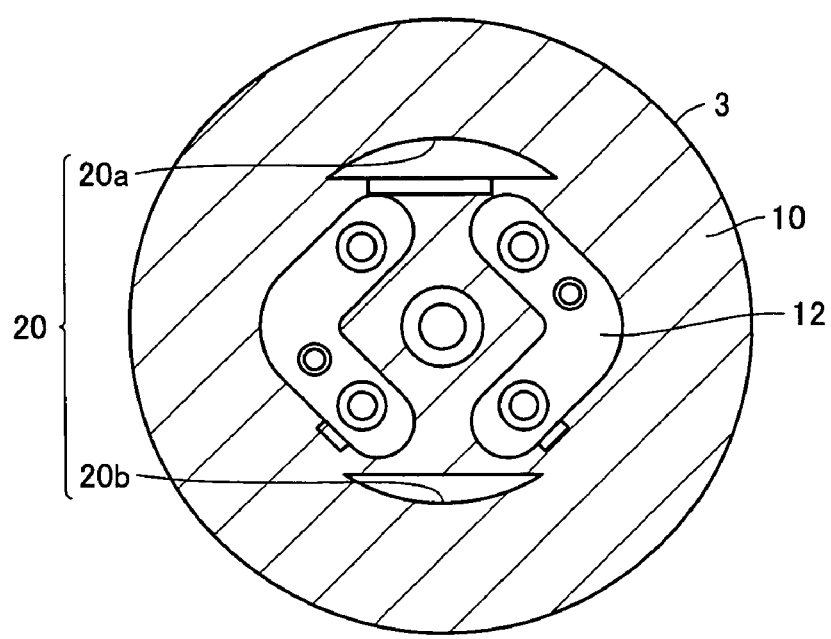
FIG. 4 is a cross sectional view of the headlamp of the first embodiment taken along the line IV-IV in FIG. 2.
Figure 5:
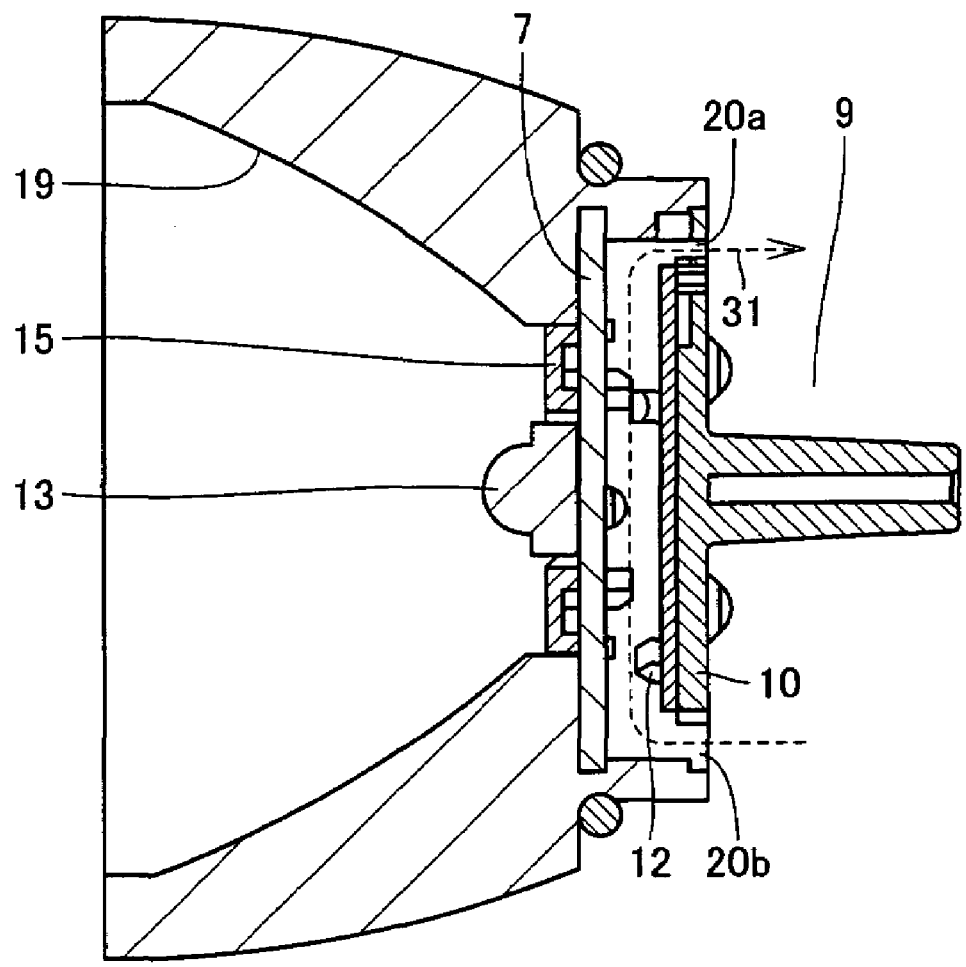
FIG. 5 is a partial enlarged cross sectional view showing a substrate portion and its vicinity in the headlamp of the first embodiment.

As shown in FIGS. 2, 4 and 5, headlamp 1 is further provided with a vent hole 20 at partition 10 of battery case 9, for circulation of the air between the spacing 8 and the inside of the battery case. Vent hole 20 has an upper vent hole 20a and a lower vent hole 20b that are formed on the upper and lower portions, respectively, of partition 10 corresponding to the upward and downward directions of the headlamp in the secured state (in the use state).

In this headlamp 1, firstly, heat generated from light-emitting diode 13 having turned on is conducted to substrate portion 7. The heat is then dissipated into the surrounding area, to thereby warm the air in spacing 8. The warmed air rises to the upper part in spacing 8.

Since upper vent hole 20a is provided to establish communication of spacing 8 with the space within battery case 9, the warmed air flows via upper vent hole 20a into battery case 9, as shown by an arrow 31, away from substrate portion 7. As the air becomes farther from substrate portion 7 being the heat source, it is gradually cooled and thus flows downward in battery case 9. The air having reached the bottom part of battery case 9 flows via lower vent hole 20b back into spacing 8 provided between partition 10 and substrate portion 7. The air repeats the above-described movement.

As such, the air circulates through spacing 8 and the inside of battery case 9 by repeating the cycle where the air within spacing 8 warmed by the heat dissipated from substrate portion 7 is sent via upper vent hole 20a into battery case 9 where it is cooled, and the cooled air is sent via lower vent hole 20b back into spacing 8 where it is warmed again.

Figure 6:
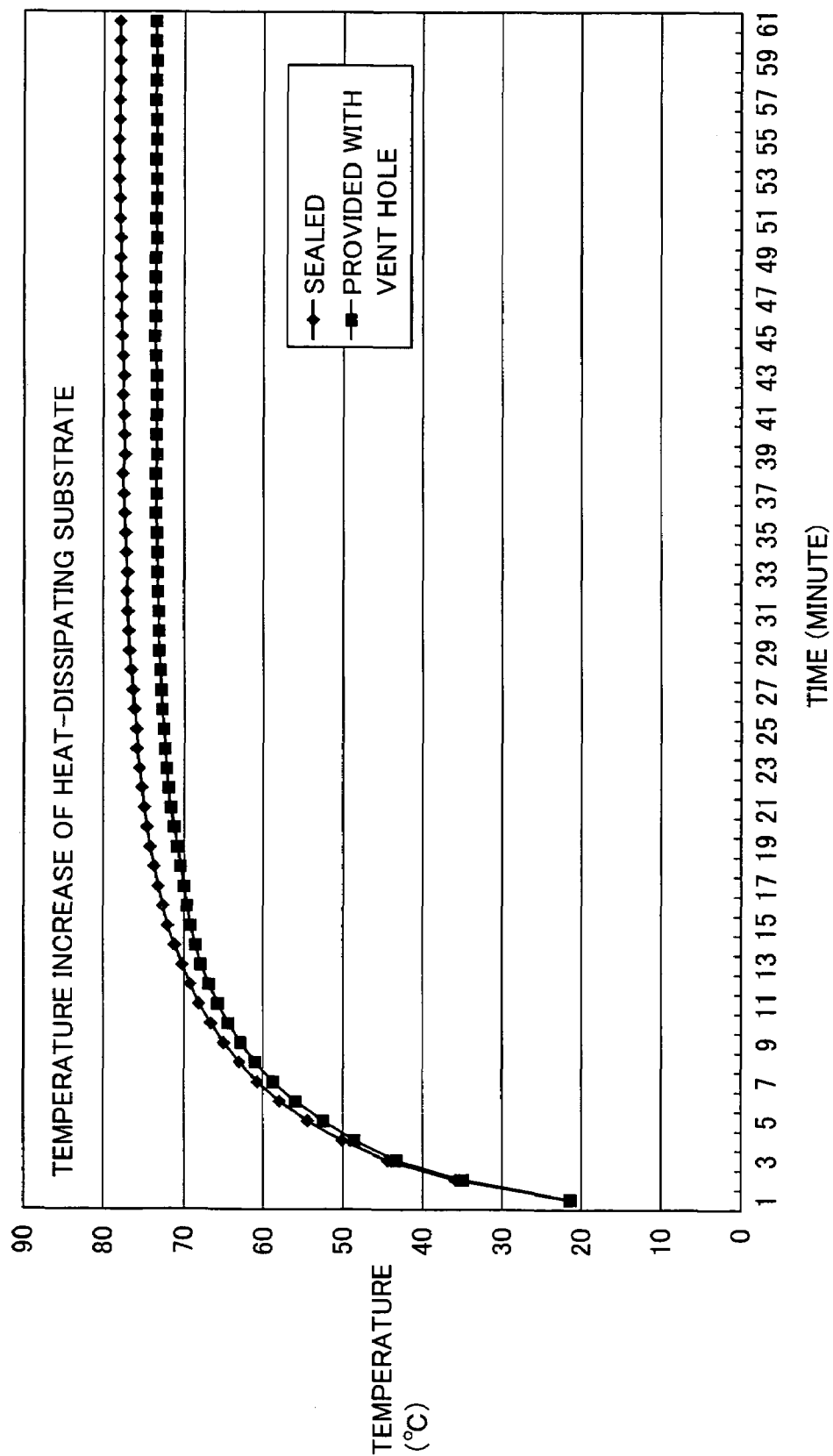
FIG. 6 is a graph showing time-dependency of the substrate temperature in the first embodiment.

Evaluation was performed as to an increase in temperature of the substrate portion of the headlamp according to the present embodiment where the air is circulated as described above, in comparison with the case of a conventional headlamp. A result of the evaluation is now explained. FIG. 6 is a graph showing the temperature increase of the substrate portion after the light-emitting diode is turned on. The graph shows time-dependency of the temperature of the substrate portion, with the horizontal axis and the vertical axis representing time (minute) and temperature, respectively.

As shown in FIG. 6, the temperature of the substrate portion gradually increases from the turning on of the light-emitting diode. It ceases to increase after about 30 minutes, and becomes thermally balanced. The temperature of the substrate portion at this time was about 78° C. in the conventional headlamp, whereas it was about 73° C. in the present embodiment, having proved that provision of vent hole 20 enables circulation of the air, resulting in efficient heat dissipation.

As described above, according to the headlamp of the present embodiment, as shown by the graph of FIG. 6, compared to the conventional headlamp not provided with a vent hole, the heat conducted from light-emitting diode 13 to substrate portion 7 is efficiently dissipated, thereby suppressing an excessive increase of the temperature of substrate portion 7. As a result, it is possible to prevent degradation of light-emitting diode 13 and other elements mounted on substrate portion 7, and ensure longer lives thereof.

Second Embodiment

Figure 7:
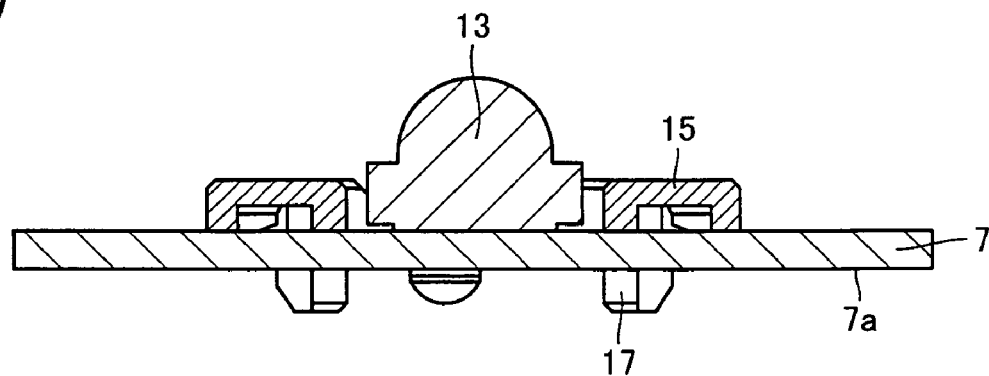
FIG. 7 is a cross sectional view showing a substrate portion that is used in a headlamp employing a light-emitting diode according to a second embodiment of the present invention.

A headlamp employing a light-emitting diode according to a second embodiment of the present invention is now described. In the present embodiment, as shown in FIG. 7, a substrate portion 7 to which a light-emitting diode 13 is mounted is formed only of an aluminum plate 7a. Light-emitting diode 13 is mounted to a holder 15 that is provided directly on a surface of aluminum plate 7a.

Figure 8:
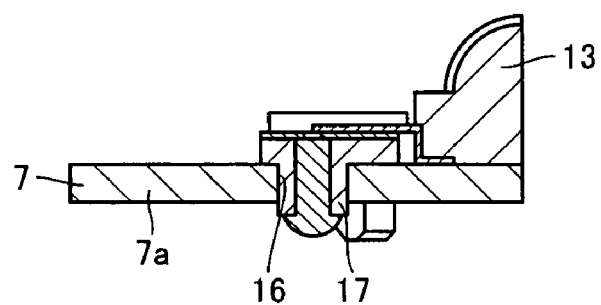
FIG. 8 is a partial enlarged cross sectional view showing a rivet and its vicinity of a substrate portion in the headlamp of the second embodiment.

Further, as shown in FIG. 8, substrate portion 7 is provided with a through hole 16 penetrating therethrough. A hollow rivet 17 as a prescribed rivet is mounted to through hole 16.

Figure 9:
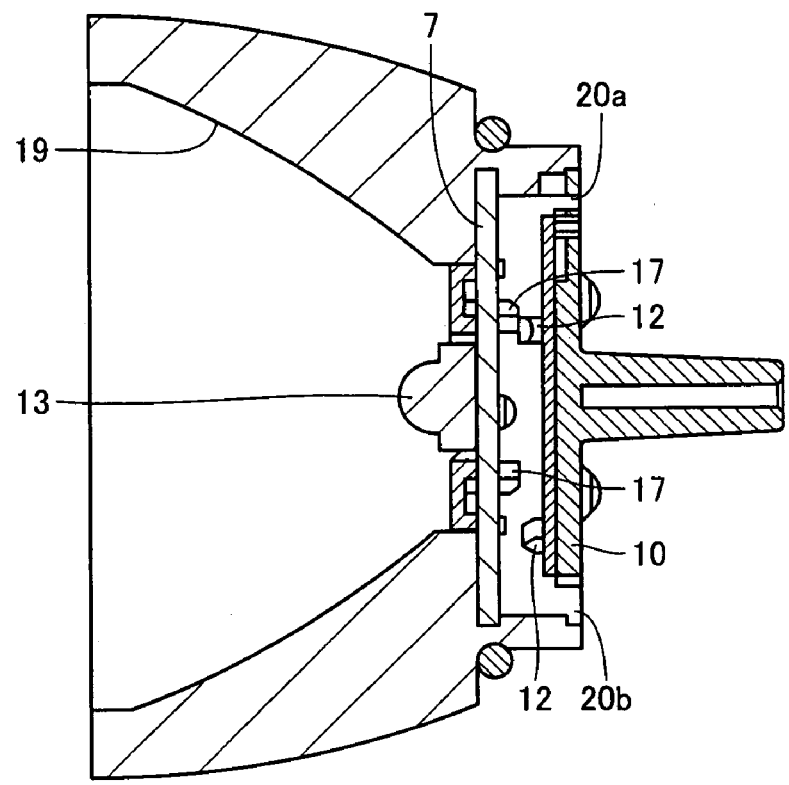
FIG. 9 is a partial enlarged cross sectional view showing the substrate portion and its vicinity in the headlamp of the second embodiment.

As shown in FIGS. 8 and 9, rivet 17 has one end connected to a terminal of light-emitting diode 13, and another end connected to a terminal 12 provided on partition 10 of battery case 9 for providing power.

Figure 10:
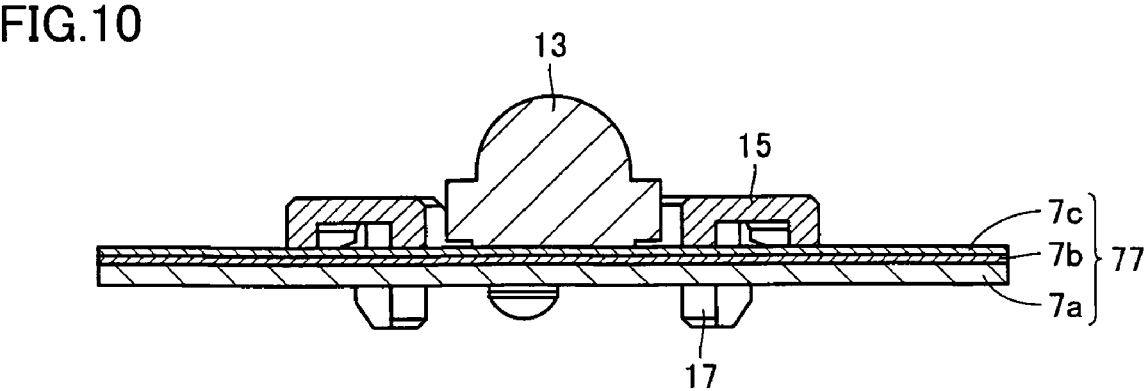
FIG. 10 is a cross sectional view showing another substrate portion for comparison in the second embodiment.

As described above, in the headlamp of the present embodiment, substrate portion 7 formed only of aluminum plate 7a is employed for substrate portion 7 to which light-emitting diode 13 is mounted. As such, compared to the case of a substrate portion 77 as shown in FIG. 10 where a copper foil 7c is formed on an aluminum plate 7a with an epoxy resin 7b interposed therebetween, the heat generated from light-emitting diode 13 is conducted to aluminum plate 7a more efficiently. The heat conducted to aluminum plate 7a is efficiently cooled by the air circulating through spacing 8 and the inside of battery case 9, as described above.

Further, in the headlamp of the present embodiment, a terminal, of light-emitting diode 13 is soldered to hollow rivet 17 mounted to substrate portion 7. This suppresses conduction of the heat upon soldering, from the soldered portion to substrate portion 7. Thus, soldering can be carried out without applying excessive heat to the part of the substrate portion to which the terminal of the light-emitting diode is connected. As a result, degradation of the elements mounted to substrate portion 7 can be prevented, and workability in soldering improves as well.

It is noted that, even in the case where substrate portion 77 having copper foil 7c formed on aluminum plate 7a with epoxy resin 7b interposed therebetween is used as the substrate portion, provision of the vent hole for establishing communication of spacing 8 with the inside of battery case 9 as described above enables circulation of the air warmed by the heat dissipated from substrate portion 77, unlike the case of a conventional headlamp not provided with such a vent hole, so that efficient heat dissipation of substrate portion 77 becomes possible.

Further, although the aluminum plate has been shown as a main body of the substrate portion, not limited thereto, it may be any metal exhibiting relatively high thermal conductivity.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A headlamp employing a light-emitting diode, comprising:
   a prescribed casing;
   a battery case formed in said casing and accommodating a battery for providing prescribed power to said light-emitting diode;
   a substrate portion provided in said casing, spaced apart from said battery case, and mounted with said light-emitting diode and serving as a heat sink;
   a partition arranged on a side of said battery case to face said substrate portion, and being spaced from said substrate portion; and
   a vent hole formed through said partition for circulation of the air between the space that is provided between said substrate portion and said partition and the inside of said battery case.

2. The headlamp according to claim 1, wherein said vent hole is provided at both an upper portion and a lower portion of partition that separates said spacing from the inside of said battery case.

3. The headlamp according to claim 1, wherein
   said substrate portion includes
   a substrate main body and
   a holder provided on said substrate main body and to which said light-emitting diode is mounted,
   said substrate main body being formed only of a metal plate, and said holder being provided to contact a surface of said metal plate.

4. The headlamp according to claim 3, wherein said metal plate is an aluminum plate.

5. The headlamp according to claim 1, wherein
   said substrate portion includes
   a substrate main body and
   a holder provided on said substrate main body and to which said light-emitting diode is mounted,
   said substrate main body including a metal plate and a metal foil formed on said metal plate with a resin interposed therebetween, and said holder being provided to contact a surface of said metal foil.

6. The headlamp according to claim 5, wherein said metal foil is a copper foil.

7. The headlamp according to claim 5, wherein said metal plate is an aluminum plate.

8. The headlamp according to claim 1, wherein
   said substrate portion includes
   an opening penetrating through said substrate portion and
   a rivet mounted to said opening and connected with a terminal of said light-emitting diode and also made to electrically contact the battery housed in said battery case,
   said rivet being a hollow rivet.

9. A headlamp empoying a light-emitting diode, comprising:
   a casing;
   a battery case formed in said casing and accommodating at least one battery for providing power to said light-emitting diode;
   a substrate portion provided in said casing, spaced apart from said battery case, and mounted with said light-emitting diode and serving as a heat sink;
   a partition in said casing constructed and arranged to face said substrate portion, and being spaced from said substrate portion; and
   vent hole means formed through said partition for circulation of the air between the space that is provided between said substrate portion and saud partition and the inside of said battery case.

10. The hesdlamp according to claim 1, wherein said vent hole means comprises a first vent hole in an upper portion of said partition and a second vent hole in a lower portion of said partition.

* * * * *

UNITED STATES PATENT AND TRADEMARK OFFICE
CERTIFICATE OF CORRECTION

PATENT NO. : 7,258,475 B2  
APPLICATION NO. : 11/064560  
DATED : August 21, 2007  
INVENTOR(S) : Toshimitsu Kurumatani It is certified that error appears in the above-identified patent and that said Letters Patent is hereby corrected as shown below:

col. 1, line 5, delete "1". before "Field".
col. 1, line 8, delete "2". before "Description."
col. 3, line 56, add -- 12 -- after "terminal".
col. 6, line 3, add -- said-- between "of" and "partition"
col. 6, line 55, change "saud" to --"said" --

Signed and Sealed this

Thirteenth Day of November, 2007

JON W. DUDAS
*Director of the United States Patent and Trademark Office*